(12) United States Patent
Geraghty et al.

(10) Patent No.: US 10,040,195 B2
(45) Date of Patent: Aug. 7, 2018

(54) RECOGNIZING A LOCATION OF A ROBOT SHARED IN MULTIPLE DATA CENTERS

(71) Applicant: International Business Machines Corporation, Armonk, NY (US)

(72) Inventors: Edward T. Geraghty, Cambridge, MA (US); Steven L. Lubars, Newton, MA (US); John C. Nelson, Newtown, CT (US); Tolga Oral, West Roxbury, MA (US)

(73) Assignee: International Business Machines Corporation, Armonk, NY (US)

(*) Notice: Subject to any disclaimer, the term of this patent is extended or adjusted under 35 U.S.C. 154(b) by 35 days.

(21) Appl. No.: 15/188,021

(22) Filed: Jun. 21, 2016

(65) Prior Publication Data

US 2017/0361463 A1    Dec. 21, 2017

(51) Int. Cl.
*G06F 19/00* (2018.01)
*B25J 9/16* (2006.01)

(52) U.S. Cl.
CPC ............ *B25J 9/1664* (2013.01); *Y10S 901/01* (2013.01); *Y10S 901/46* (2013.01)

(58) Field of Classification Search
CPC ...... B25J 9/1664; Y10S 901/01; Y10S 901/46
USPC ....................................................... 700/251
See application file for complete search history.

(56) References Cited

U.S. PATENT DOCUMENTS

| | | |
|---|---|---|
| 7,072,739 B2 | 7/2006 | Bash et al. |
| 7,388,879 B2 * | 6/2008 | Sabe ..................... H04L 67/10 370/328 |
| 7,642,914 B2 | 1/2010 | Campbell et al. |
| 7,742,840 B2 | 6/2010 | Watabe et al. |
| 7,792,943 B2 | 9/2010 | Chainer et al. |
| 7,840,308 B2 | 11/2010 | Matsunaga et al. |
| 8,271,639 B2 | 9/2012 | Joukov |

(Continued)

FOREIGN PATENT DOCUMENTS

JP    2007249735 A    9/2007

OTHER PUBLICATIONS

Lenchner, J., et al., "Towards Data Center Self-Diagnosis Using a Mobile Robot", ICAC, Jun. 2011, 10 pages.

(Continued)

*Primary Examiner* — Ronnie Mancho
(74) *Attorney, Agent, or Firm* — Scully, Scott, Murphy & Presser, P.C.; Kurt Goudy, Esq.

(57) ABSTRACT

A method for recognizing a location of a robotic device includes collecting first environmental data corresponding to a first current location of the robotic device, generating a first location signature based on the first environmental data, driving the robotic device to enter a standby mode at a first time, driving the robotic device to wake up from the standby mode after a predetermined time elapses at a second time after the driving the robotic device to enter the standby mode, collecting second environmental data corresponding to a second current location of the robotic device, generating the second location signature generated based on the second environmental data, comparing the first and second location signatures, and determining whether a location of the robotic device has been changed between the first and second times based on a comparison result between the first and second location signatures.

20 Claims, 11 Drawing Sheets

(56) References Cited

U.S. PATENT DOCUMENTS

| | | | |
|---|---|---|---|
| 8,751,043 B2 | 6/2014 | Guo et al. | |
| 8,780,342 B2 | 7/2014 | DiBernardo et al. | |
| 8,990,107 B2 * | 3/2015 | Liang | H04W 52/0251 |
| | | | 705/14.49 |
| 9,037,485 B2 * | 5/2015 | Fu | H04L 51/04 |
| | | | 705/14.66 |
| 2009/0054075 A1 * | 2/2009 | Boejer | G01S 19/09 |
| | | | 455/456.1 |
| 2012/0242481 A1 * | 9/2012 | Gernandt | G06K 19/0705 |
| | | | 340/539.13 |
| 2014/0240088 A1 * | 8/2014 | Robinette | G08B 13/1427 |
| | | | 340/5.61 |

OTHER PUBLICATIONS

Nelson, J.C., et al., "Locating and Tracking Data Center Assets using Active RFID Tags and a Mobile Robot", 2013 10th International Conference and Expo on Emerging Technologies for a Smarter World (CEWIT), Oct. 2013, 6 pages.

* cited by examiner

RECOGNIZING A LOCATION OF A ROBOT SHARED IN MULTIPLE DATA CENTERS

FIELD

The present disclosure relates to an autonomous robot for monitoring environmental metrics of data centers, and more specifically, to a system and a method for recognizing a location of the robot shared in multiple data centers.

BACKGROUND

Autonomous robots are deployed in a site including multiple data centers to patrol the data centers to collect sensor data such as temperature, humidity, radio-frequency identification (RFID) proximity/location, or the like.

Researches on the robot have been made on finding a location or a path of a robot in the data center. In some cases, one or more robots may be shared among multiple data centers, however, it is a challenge for data center operators to ensure that each robot is able to become self-aware of its location when it is moved within a site or from one data center to another during its sleep mode. Since the sensor data collected are associated with a data center, the robot might not provide correct data without knowing its location.

SUMMARY

In one aspect there is provided a method for recognizing a location of a robotic device in one or more data centers. The method includes collecting first environmental data corresponding to a first current location of the robotic device in the one or more data centers, generating a first location signature based on the first environmental data, driving the robotic device to enter a standby mode at a first time, driving the robotic device to wake up from the standby mode at a second time after a predetermined time elapses after the driving the robotic device to enter the standby mode, collecting second environmental data corresponding to a second current location of the robotic device, generating the second location signature generated based on the second environmental data, comparing the second location signature with the first location signature, and determining whether a location of the robotic device has been changed between the first and second times based on a comparison result of the second location signature with the first location signature.

In another aspect there is provided a system for recognizing a location of a robotic device in one or more data centers. The system includes a signal collecting unit and a processing unit. The signal collecting unit is configured to collect first environmental data corresponding to a first current location of the robotic device prior to the robotic device entering a standby mode and to collect second environmental data corresponding to a second current location of the robotic device after the robotic device waking up from the standby mode. The processing unit generates a first location signature based on the first environmental data and a second location signature using the second environmental data, compares the second location signature with the first location signature, and determines whether a location of the robotic device has been changed during the standby mode of the robotic device based on a comparison result of the second location signature with the first location signature.

Further, in another aspect, there is provided a computer program product for performing a method of recognizing a location of a robotic device in one or more data centers. The computer program product is stored in a non-transitory computer-readable storage medium having computer readable program instructions. The computer readable program instructions are read and carried out by a processor. The method includes collecting first environmental data corresponding to a first current location of the robotic device in the one or more data centers, generating a first location signature based on the first environmental data, driving the robotic device to enter a standby mode at a first time, driving the robotic device to wake up from the standby mode at a second time after a predetermined time elapses after the driving the robotic device to enter the standby mode at a second time, collecting second environmental data corresponding to a second current location of the robotic device, generating the second location signature generated based on the second environmental data, comparing the second location signature with the first location signature, and determining whether a location of the robotic device has been changed between the first and second times based on a comparison result of the second location signature with the first location signature.

DETAILED DESCRIPTION OF THE EMBODIMENTS

Figure 1:
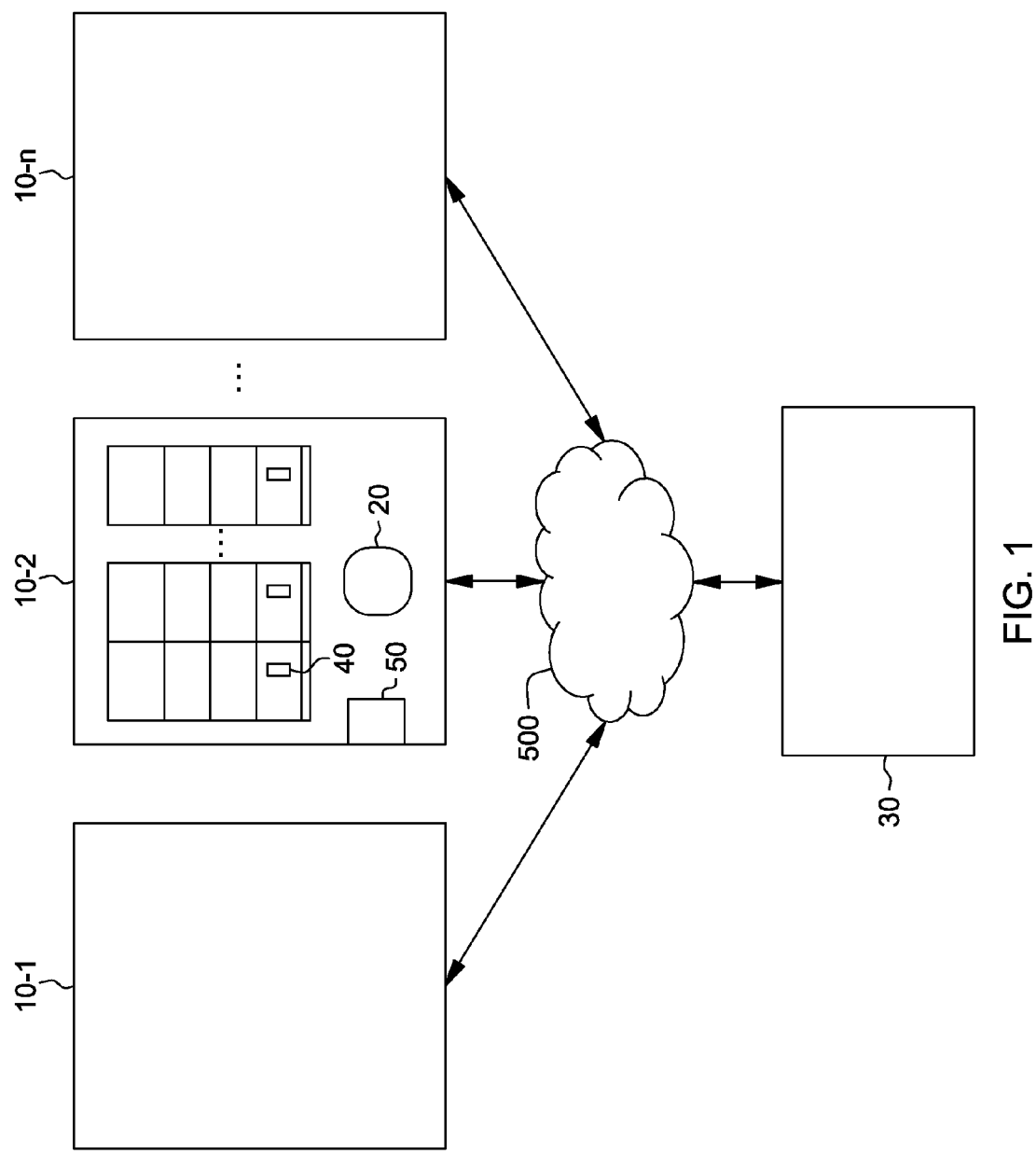
FIG. 1 illustrates a system for recognizing a location of a robotic device in a site including a plurality of data centers according to an embodiment of the present disclosure.

Like reference numerals may refer to like elements throughout the written descriptions and drawings.

Figure 2:
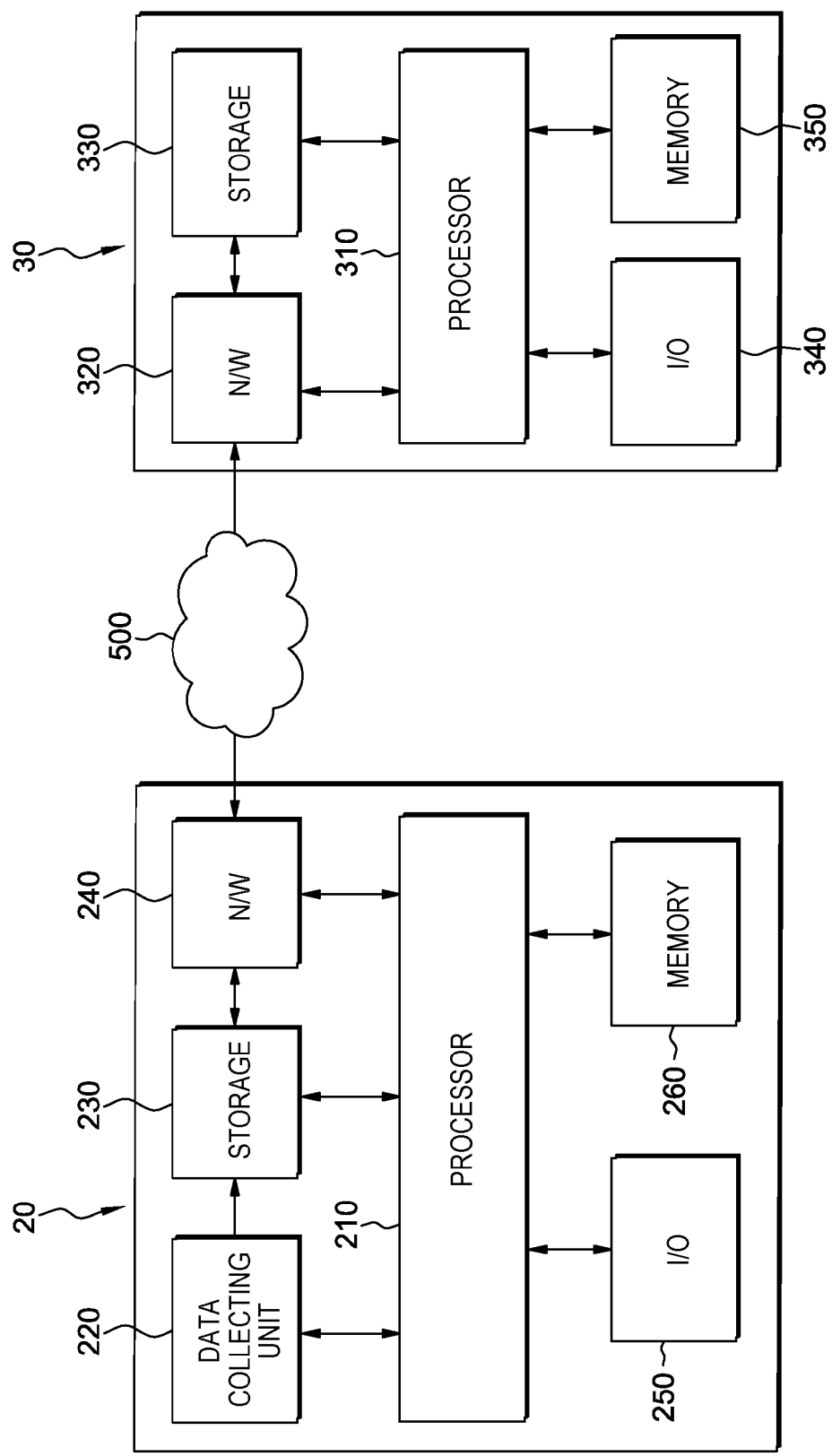
FIG. 2 is a block diagram illustrating a robotic device and a host according to an embodiment of the present disclosure.
Figure 3:
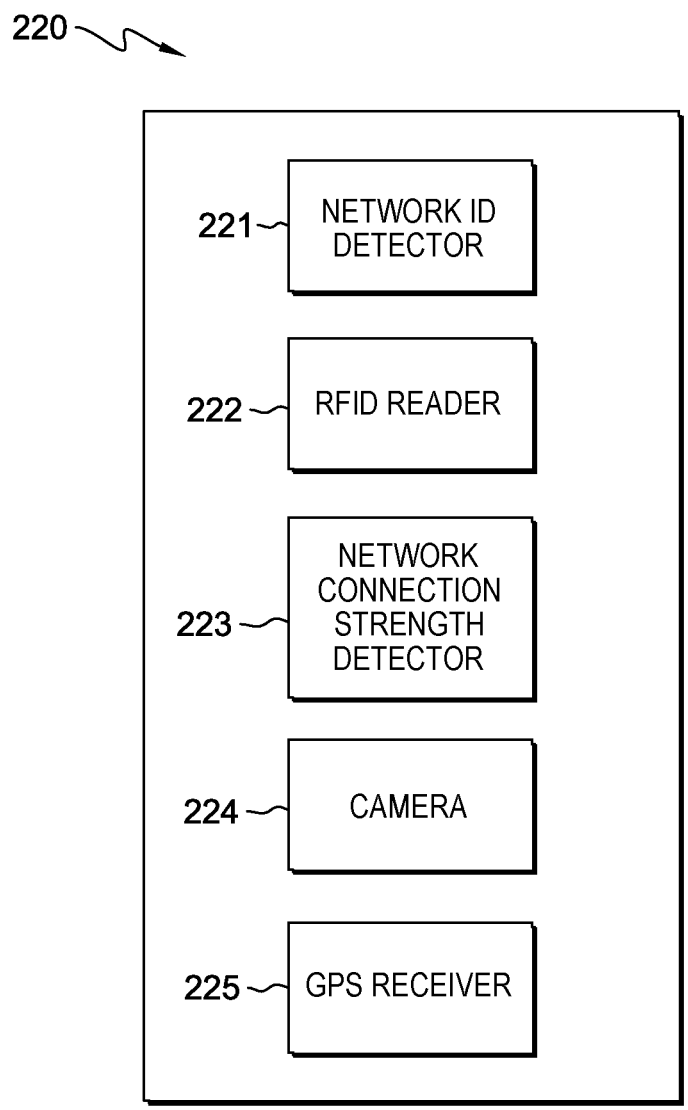
FIG. 3 is a block diagram illustrating a data collecting unit according to an embodiment of the present disclosure.
Figure 4A:
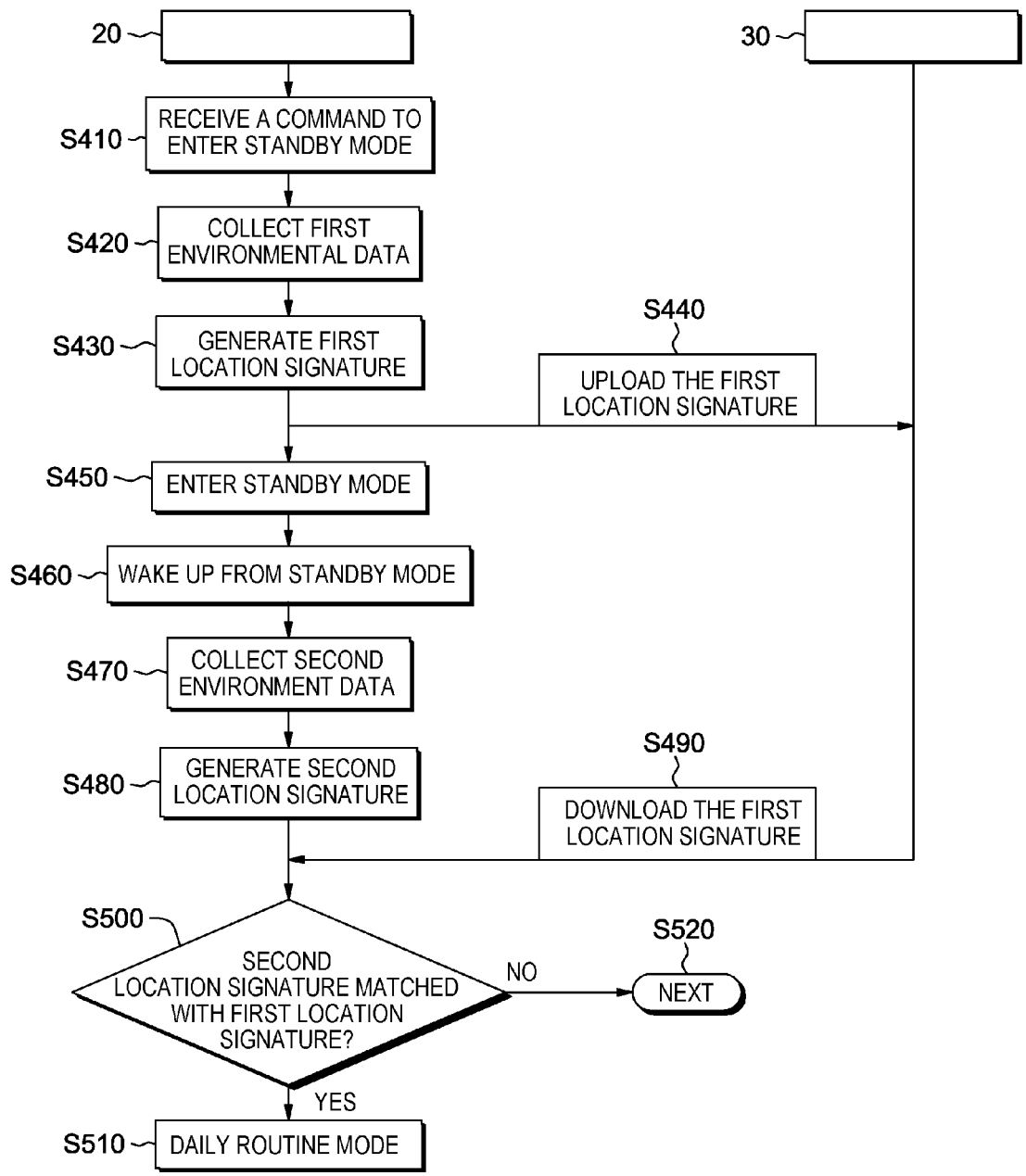
FIGS. 4A and 4B are flow charts illustrating operations of the robotic device and the host of FIG. 2 for recognizing a location change of the robotic device according to an embodiment of the present disclosure.
Figure 4B:
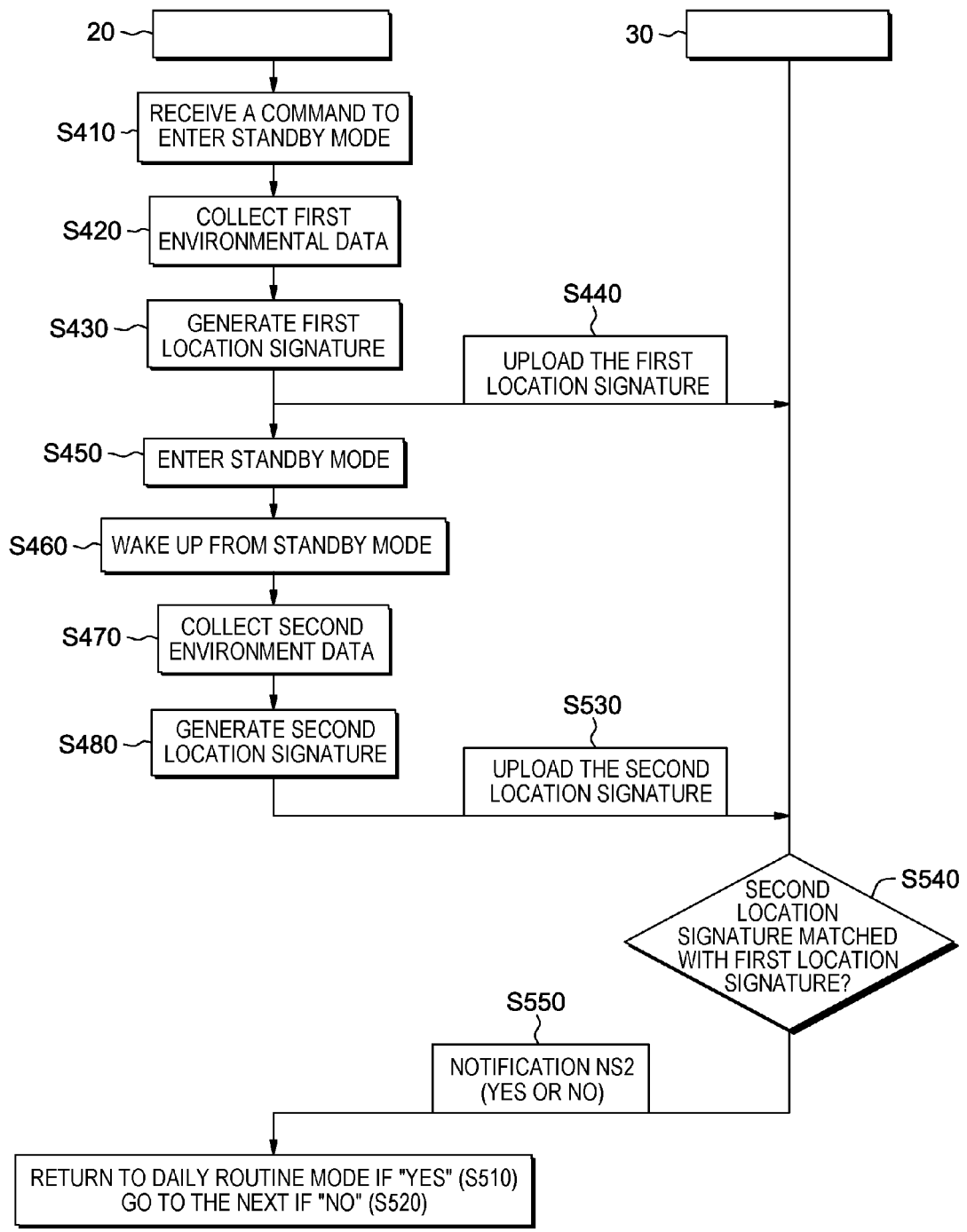

FIG. 1 illustrates a system for recognizing a location of a robotic device 20 in a site including a plurality of data centers 10-1 to 10-$n$ according to an embodiment of the present disclosure. FIG. 2 is a block diagram illustrating a robotic device 20 and a host 30 according to an embodiment of the present disclosure. FIG. 3 is a block diagram of a data collecting unit 220 according to an embodiment of the present disclosure. FIGS. 4A and 4B are flow charts illustrating operations of the robotic device 20 and the host 30 for recognizing a location change of the robotic device 20 according to an embodiment of the present disclosure.

Referring to FIG. 1, the robotic device 20 may collect various sensor data while exploring data centers to report the collected sensor data to the host 30 for the management purpose on the data centers' environments. The sensor data may include, but not limited to, humidity, temperature, RFID proximity/location, or the like.

The robotic device 20 may be located in a site including a plurality of data centers 10-1 to 10-n and may be employed and operated in an environment of multiple data centers. For example, the robotic device 20 may be shared among the multiple data centers. Thus, the robotic device 20 may be moved by a user from one data center to another.

In this case, the robotic device 20 may need to recognize of its location correctly regardless of its location change among the data centers, so that correct sensor data associated with the current data center where the robotic device 20 is located can be reported to the host 30.

Each of the data centers 10-1 to 10-n may include a plurality of racks having more than one server, as shown in FIG. 1, and RFID tags 40 may be attached to a certain rack to provide various information such as a location, an identification, or the like. Further, each of the data centers 10-1 to 10-n may include a network device 50 such as a WiFi access point, a network router, or the like.

Some operations of the robotic device 20 may be programmed in executable codes therein or controlled by the host 30 in a remote manner though a network 500.

The network 500 may be implemented using on a wired communication based on internet, local area network (LAN), wide area network (WAN), or a wireless communication based on code division multiple access (CDMA), global system for mobile communication (GSM), wideband CDMA, CDMA-2000, time division multiple access (TDMA), long term evolution (LTE), wireless LAN, Bluetooth, or the like.

Referring to FIG. 2, the robotic device 20 may include a processor 210, a data collecting unit 220, a storage 230 (e.g., a hard disk drive), a network adaptor 240, an input/output (I/O) interface 250, a memory 260 (e.g., a random access memory (RAM) or a read only memory (ROM)). Although not shown in FIG. 2, a robotic device according to an embodiment of the present disclosure may include, but not limited to, robotic features such as wheels, arms, or other sub systems for handling movement, a navigation, and sensors. In addition, the host 30 may include a processor 310, a network adaptor 320, a storage 330 (e.g., a hard disk drive), an I/O interface 340, and a memory 350 (e.g., a RAM or a ROM). A hashing algorithm (not shown) may be stored in the storage 230 or the memory 260 of the robotic device 20 and/or the storage 330 or the memory 350 of the host 30. In an embodiment, the hashing algorithm may be stored in a database of a remote storage (not shown). The hashing algorithm may be implemented using, but not limited to, MD5 message-digest algorithm or secure hash algorithm (SHA), e.g., SHA-0 to SHA-3, and accessed by the processor 210 of the robotic device 20 or the processor 310 of the host 30 to provide a hash signature in response to an input of raw data. These features will be described in more detail with reference to FIGS. 4A and 4B.

In a daily routine mode, while moving around each data center, the robotic device 20 may collect the above-described sensor data corresponding to locations of the data center and transmit the collected sensor data to the host 30 over the network 500.

The robotic device 20 may be preprogrammed to return to a base station (e.g., a charging station) for charging when its battery level is lower than a predetermined level, it shuts down, or its daily routine tasks end. However, the present disclosure is not limited thereto. For example, the robotic device 20 may return to a base station in response to a command (or a control signal) provided from the host 30. For example, the robotic device 20 may enter a standby mode in response to a command which may be provided from executable program codes stored in, e.g., the memory 260 of the robotic device 20 or the control signal transmitted from the host 30. When the robotic device 20 returns to the base station, it may enter the standby mode (e.g., a sleep mode, a hibernating mode, an idle mode). In addition, after a certain time elapses, the robotic device 20 may wake up from the standby mode. Similarly, the robotic device 20 may wake up in response to a command (or a control signal) provided from the host 30 or a command provided from executable program codes stored in, e.g., the robotic device 20 or the host 30. For example, the robotic device 20 may be driven to enter the standby mode or wake up therefrom in response to a command (or a control signal) provided from the host 30 or a command provided from executable program codes stored in, e.g., the robotic device 20 or the host 30.

Hereinafter, a location where a robotic device (e.g., the robotic device 20) enters the standby mode may be referred to as a "first current location L1", and a location where the robotic device wakes up from the standby mode may be referred to as a "second current location L2" for the purpose of simplicity.

For example, if a certain robotic device in the standby mode has not been moved by a user, there might not be a change in location thereof, and thus the second current location L2 may be the same as the first current location L1. On the other hand, if the robotic device in the standby mode has been moved by a user, there may occur a change in location thereof, and thus the second current location L2 may be different from the first current location L1.

Further, for example, when the first and second current locations L1 and L2 are the same, this may be understood as that the robotic device is located to serve in the same data center before entering the standby mode and after waking up therefrom, also when the first and second current locations L1 and L2 are different from each other, this may be understood as that the robotic device is located to serve in different data centers before the entering the standby mode and after the waking up therefrom.

Referring to FIGS. 2, 3 and 4A, when the robotic device 20 receives a command to enter a standby mode in an operation S410, the data collecting unit 220 may collect first environmental data ED1 in an operation S420. The first environmental data ED1 may include location-related information corresponding to the first current location L1. For example, the first environmental data L1 may include, but not limited to, a network name (e.g., a service set ID) to which the robotic device 20 is connected and nearby, an RFID information obtained by reading data from tags and nearby racks, connection strengths to nearby wireless routers, pictures from its cameras, and/or global positioning system (GPS) coordinates of the first current location L1 and nearby. To this end, the data collecting unit 220 may include a network ID detector 221, an RFID reader 222, a network connection strength detector 223, a camera (e.g., webcam) 224, and/or a GPS receiver 225, as shown in FIG. 3. For example, only signals (or data) that are constant/static in the environment may preferably be used in comparison to using frequently changing points, to minimize false positives. In an embodiment, the environmental data (e.g., ED1 or ED2) may be data which remained unchanged for a relatively long-term period (e.g., at least one overnight or one day).

Referring back to FIGS. 2 and 4A, the processor 210 of the robotic device 20 may generate a first location signature LS1 based on the first environmental data ED1 in an operation S430. The robotic device 20 may transmit (or upload) the generated first location signature LS1 to the host 30 using the network adaptor 240 in an operation S440. In an embodiment, the first location signature LS1 may be one of a raw version of the first environmental data ED1, which will be referred to as a "first raw data RD1", a hash version of the first raw data RD1, which will be referred to as a "first hash signature HS1", and a combination of the first raw data RD1 and the first hash signature HS1. Further, in an embodiment, the first location signature LS1 may be a combination of a raw version (which will be referred to as "third raw data RD3) of some first environmental data ED1 which is/are less static over a time and a hash version (which will be referred to as a "third hash signature HS3) of other first environmental data ED1 which is/are more static over the time, and thus, the above raw data (e.g., the third raw data RD3) may be employed to help the robotic device 20 or the host 30 determine (or compute) a threshold TH in a comparison of the first location signature LS1 with a second location signature LS2 generated after the robotic device 20 wakes up. More details of the second location signature LS2 and the operation of comparing of the second location signature LS2 with the first location signature LS1 will further be described with reference to FIGS. 4A and 4B.

The processor 210 may generate the first raw data RD1 by, but not limited to, reorganizing (or reordering) the first environmental data ED1 (e.g., one or more of the above-described network name, the RFID information obtained by reading data from tags and nearby racks, the connection strengths to the network devices, the pictures, or the GPS coordinates) according to a predetermined rule (e.g., alphabetical order). The processor 210 may further generate the first hash signature HS1 by applying a hashing algorithm (not shown) to the first raw data RD1.

Then, the robotic device 20 may enter the standby mode in an operation S450 and after a certain time elapses since the operation S450, the robotic device 20 may wake up from the standby mode in an operation S460. The data collecting unit 220 may collect second environmental data ED2 corresponding to the second current location L2 of the robotic device 20 in an operation S470. The second environmental data ED2 may include location-related information corresponding to the second current location L2. Similar to the first environmental data ED1, the second environmental data ED2 may include, but not limited to, a network name (e.g., a service set ID), RFID information obtained by reading data from tags, connection strengths to network devices, image captures, and/or GPS coordinates of the second current location L2 or nearby.

Further, referring back to FIGS. 2 and 4A, the processor 210 may generate (or calculate) the second location signature LS2 based on the second environmental data ED2 in an operation S480. Similar to the first location signature LS1, the second location signature LS2 may be one of a raw version of the second environmental data ED2, which will be referred to as a "second raw data RD2", a hash version of the second raw data RD2, which will be referred to as a "second hash signature HS2", and a combination of the second raw data RD2 and the second hash signature HS2. Further, in an embodiment, the second location signature LS2 may be a combination of a raw version (which will be referred to as a "fourth raw data RD4) of some second environmental data ED2 which is/are less static over a time and a hash version (which will be referred to as a "fourth hash signature HS4) of other second environmental data ED2 which is/are more static over the time. In an embodiment, the second raw data RD2 may be obtained by being reorganizing (or reordering) the second environmental data ED2 (e.g., one or more of the above-described network name, the RFID information obtained by reading data from tags and nearby racks, the connection strengths to the network devices, the pictures, or the GPS coordinates) according to the same predetermined rule (e.g., alphabetical order) used to generate the first raw data RD1. In addition, the processor 210 may generate (or calculate) the second hash signature HS2 using the hashing algorithm to the second raw data RD2.

Further, the robotic device 20 may receive (or download) the first location signature LS1 from the host 30 using the network adaptor 240 in an operation S490 and store the downloaded first location signature LS1 into the storage 230 or the memory 260. In addition, the robotic device 20 may compare the second location signature LS2 with the first location signature LS1 using the processor 210 in an operation S500.

Going back to the operation S450 where the robotic device 20 enters the standby mode, if the robotic device 20 in the standby mode is moved by a user (e.g., L1≠L2), the second environmental data ED2 may be different from the first environmental data ED1, and thus, the second location signature LS2 may be different from the first location signature LS1. On the other hand, if the robotic device 20 in the standby mode remains in the same location (e.g., L1=L2), the second environmental data ED2 may be the same as the first environmental data ED1, and thus, the second location signature LS2 may be the same as the first location signature LS1.

Thus, when the first location signature LS1 and the second location signature LS2 are matched with each other (e.g., Yes), the robotic device 20 may determine that its location has not been changed and return to the daily routine mode (e.g., a normal mode) in an operation S510. On the other hand, when the first and second location signatures LS1 and LS2 are not matched with each other, the robotic device 20 may determine that its location has been changed and go to the next step in an operation S520.

In an embodiment, referring to FIG. 4B, the operations of the robotic device 20 and the host 30 are substantially the same as those of FIG. 4A except the following features:

(i) The robotic device 20 may transmit (or upload) the generated second location signature LS2 to the host 30 in an operation S530, and the host 30 may determine whether the second location signature LS2 is matched with the first location signature LS1 using the processor 310 in a compare operation S540.

(ii) Further, the host 30 may transmit a notification signal NS1 including a determination result made through the operation S540 to the robotic device 20 in an operation S550. Thus, when the robotic device 20 receives the notification signal NS1 indicating that the first and second location signatures LS1 and LS2 are matched with each other, the robotic device 20 may determine that its location has not been changed and return to the daily routine mode in an operation S510. In addition, when the robotic device 20 receives the notification signal NS1 indicating that the first and second location signatures LS1 and LS2 are not matched with each other, the robotic device 20 may determine that its location has been changed and go to the next step in an operation S520.

Figure 5A:
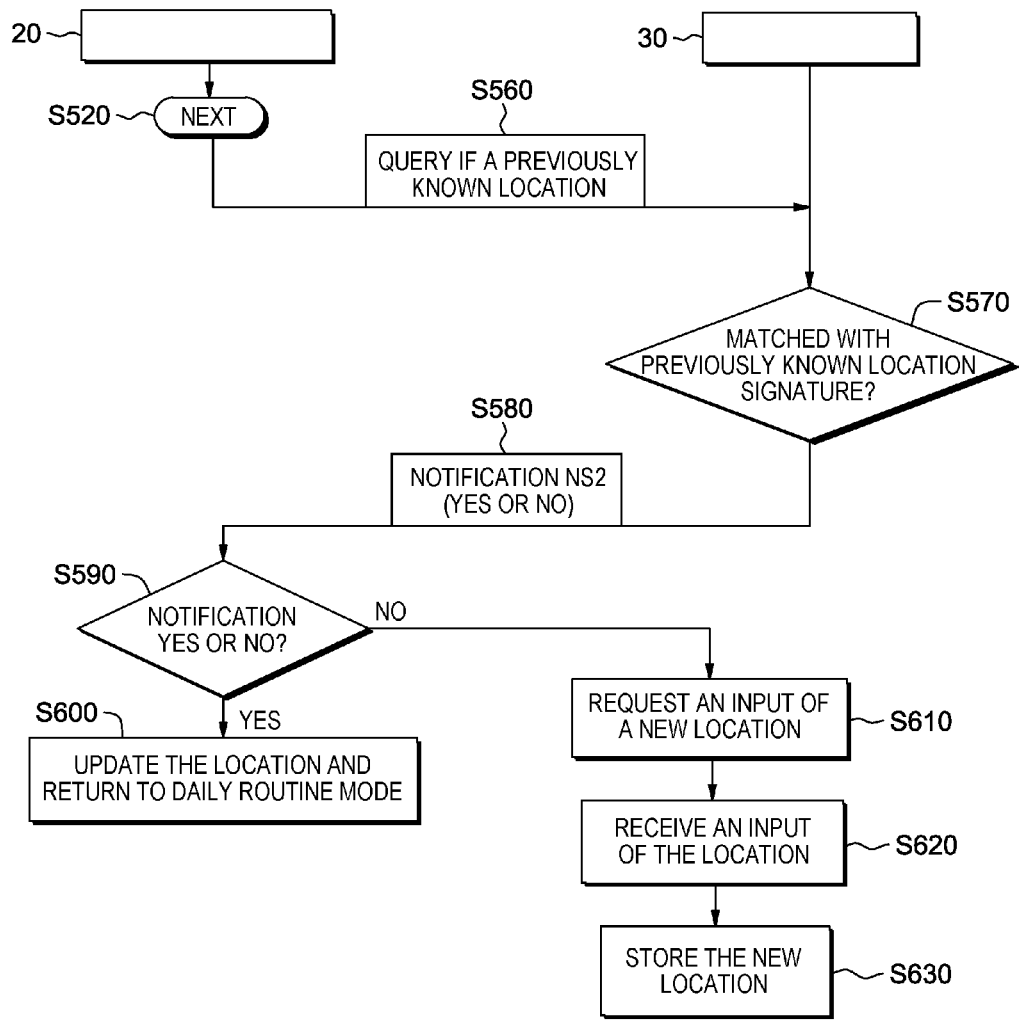
FIGS. 5A and 5B are flow chart illustrating operations of the robotic device and the host of FIG. 2 subsequent to the operation S520 of each of FIGS. 4A and 4B according to an embodiment of the present disclosure.
Figure 5B:
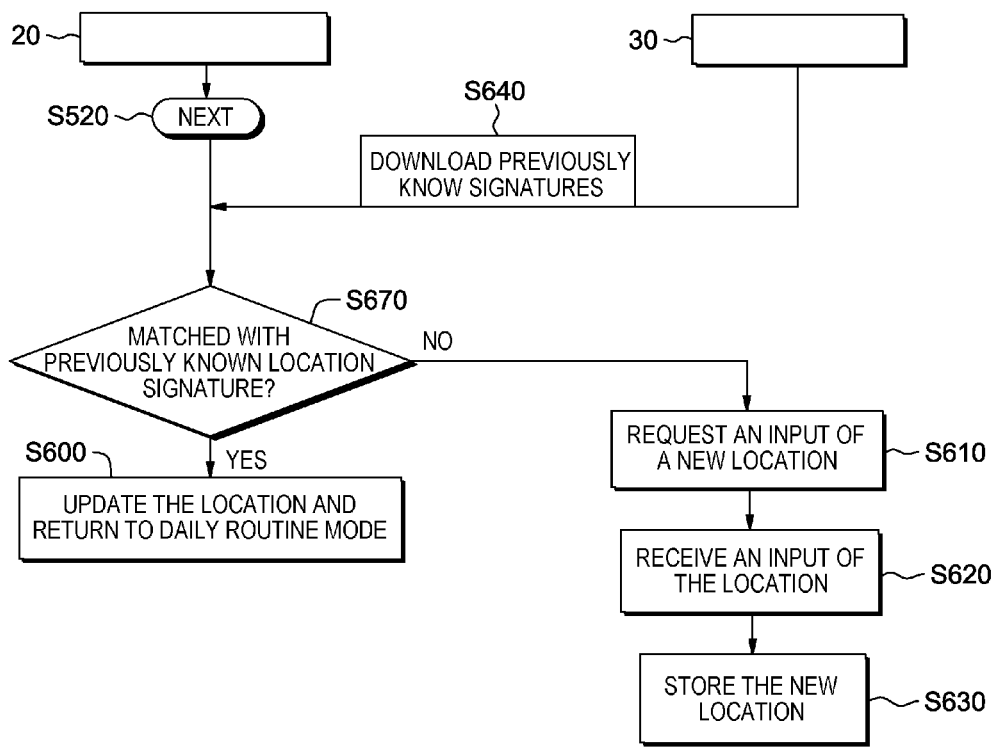

FIGS. 5A and 5B are flow chart illustrating operations of the robotic device 20 and the host 30 subsequent to the operation S520 of each of FIGS. 4A and 4B according to an embodiment of the present disclosure.

In an embodiment, referring to FIGS. 4A, 4B and 5A, when it is determined that the first and second location signatures LS1 and LS2 are not matched with each other in the operations S500 and S540, the robotic device 20 may query the host 30 whether the second current location L2 is one of previously known locations in an operation S560. For example, the previously known locations may respectively correspond to a plurality of location signatures which have been previously collected by the robotic device 20 or other robotic devices and stored in the storage 330, the memory 350, or a database in a remote storage (not shown). The host 30 may compare the second location signature LS2 with the previously collected location signatures in an operation S570 and transmit a notification signal NS2 including a determination result made through the operation S570 to the robotic device 20 in an operation S580. The robotic device 20 may receive and determine what the notification signal NS2 indicates in an operation S590. Thus, when the robotic device 20 receives the notification signal NS2 indicating that the second location signature LS2 is matched with one (e.g., a third location signature) of the previously collected location signatures, the robotic device 20 may determine that it has been moved to a location (or a data center) corresponding to the third location signature, update the location (or a data center) of the robotic device 20 to the location (or a data center) corresponding to the third location signature, and return to the daily routine mode in an operation S600. When the robotic device 20 receives the notification signal NS2 indicating that no previously collected location signature is matched with the second location signature LS2, the robotic device 20 may request a system operator to input a new location (or a data center) where the robotic device 20 is located (e.g., where the robotic device 20 has woken up) in an operation S610. In an embodiment, the system operator may include, but not limited to, a human who operates the robotic device 20 and a control system (e.g., the host 30 of FIG. 2 or a computing system 2000 of FIG. 8). In addition, the robotic device 20 may receive the input from the system operator, through the I/O interface 250, with respect to the new location (or a new data center) in an operation S620, and store the new location (or the new data center) in the storage 230 or the memory 260 in an operation S630.

In an embodiment, referring to FIGS. 4A, 4B and 6B, when it is determined that the first and second location signatures LS1 and LS2 are not matched with each other in the operations S500 and S540, the robotic device 20 may download a plurality of location signatures which have been previously collected from the robotic device 20 or other robotic devices and stored in the storage 330, the memory 350, or a database stored in a remote storage (not shown) in an operation S640. The robotic device 20 may compare the second location signature LS2 with the previously collected location signatures in an operation S650. Thus, when the robotic device 20 determines that the second location signature LS2 is matched with one (e.g., a third location signature) of the previously collected location signatures, the robotic device 20 may determine that it has been moved to a location (or a data center) corresponding to the third location signature, update the location (or the data center) of the robotic device 20 to the location (or the data center) corresponding to the third location signature, and return to the daily routine mode in an operation S600. When the robotic device 20 determines that no previously collected location signature is matched with the second location signature LS2, the robotic device 20 may request a system operator to input a new location (or a data center) (e.g., where the robotic device 20 is located (e.g., where the robotic device 20 has woken up) in an operation S610. In an embodiment, the system operator may include, but not limited to, a human who operates the robotic device 20 and a control system (e.g., the host 30 of FIG. 2 or a computing system 2000 of FIG. 8). In addition, the robotic device 20 may receive the input from the system operator, through the I/O interface 250, with respect to the new location (or a new data center) in an operation S620, and store the new location (or the new data center) in the storage 230 or the memory 260 in an operation S630.

In an embodiment, if the robotic device 20 or the host 30 receive a user input through the I/O interface 250 indicating that the robotic device 20 has not been moved and the robotic device 20 is determined to be moved to a specific location (e.g., the location corresponding to the third location signature) through the operations S570 of FIG. 5A and S650 of FIG. 5B, the robotic device 20 or the host 30 may generate a false positive signal and update a location signature (e.g., the first location signature LS1) for the first current location L1 where the robotic device 20 is located to the second location signature LS2.

Figure 6:
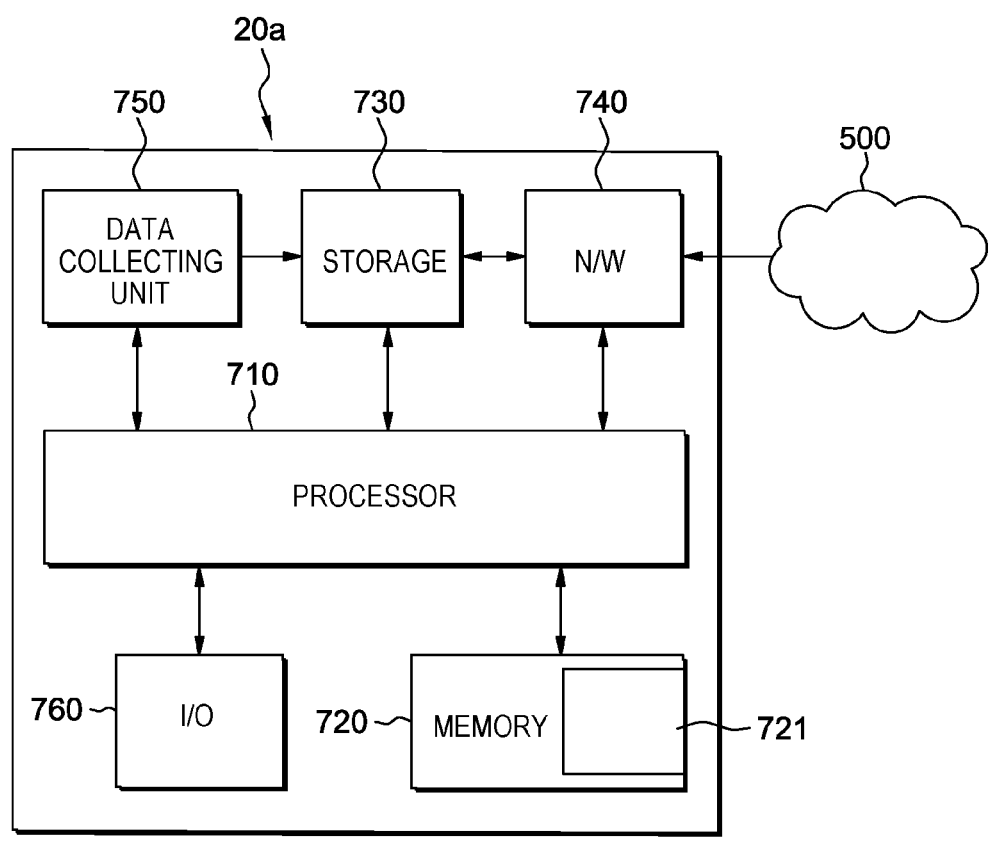
FIG. 6 is a block diagram illustrating a robotic device for recognizing a location change thereof according to an embodiment of the present disclosure.
Figure 7A:
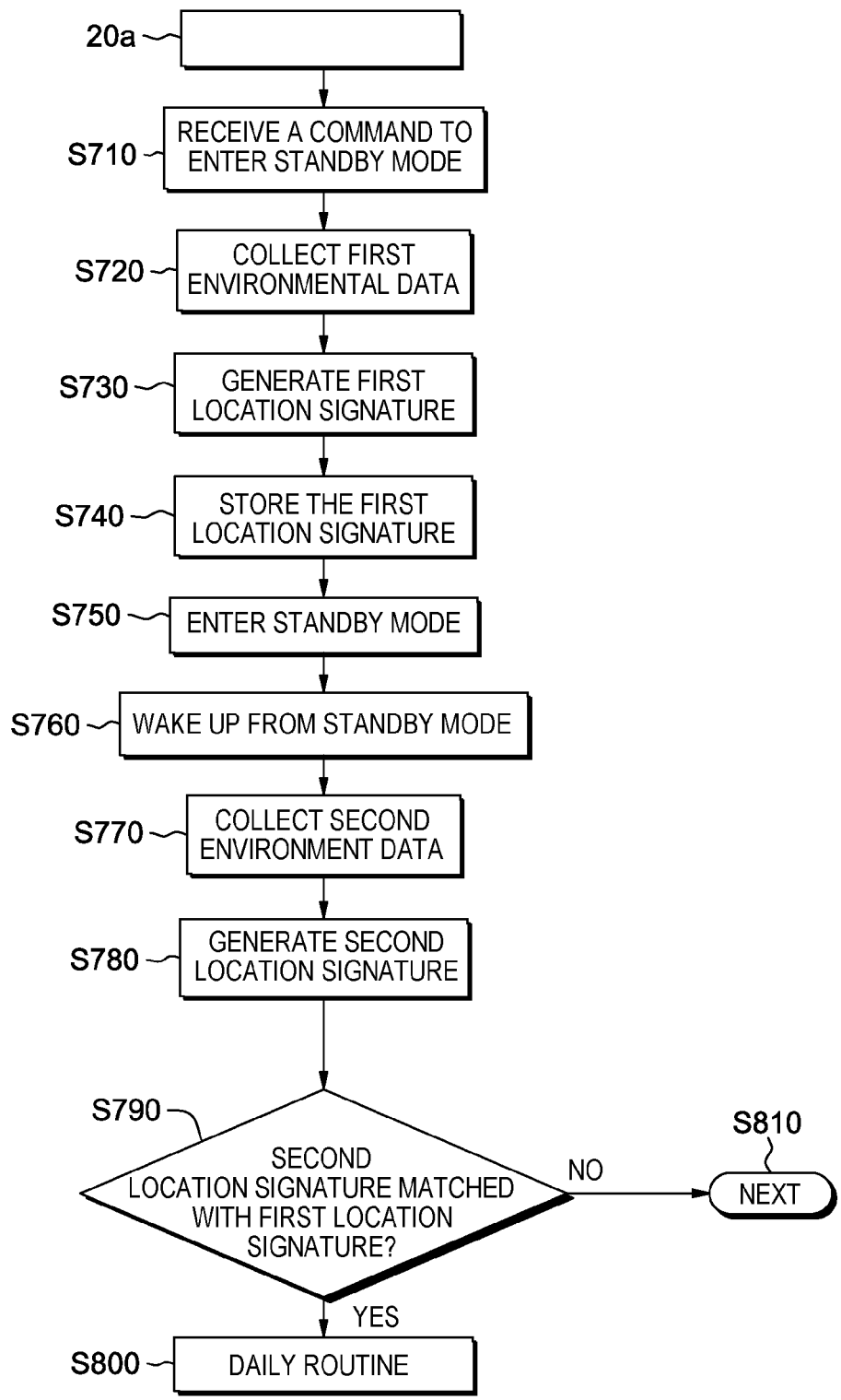
FIGS. 7A and 7B are flow charts illustrating operations of the robotic device of FIG. 7 for recognizing a location change thereof according to an embodiment of the present disclosure.
Figure 7B:
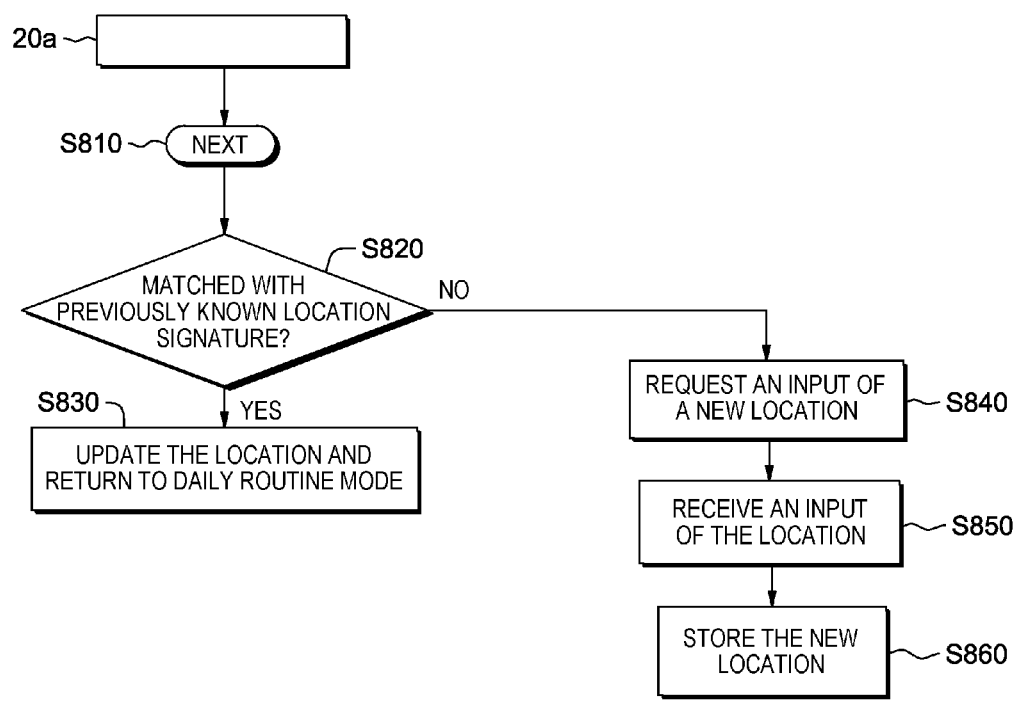

FIG. 6 is a block diagram illustrating a robotic device 20a for recognizing a location change thereof according to an embodiment of the present disclosure. FIGS. 7A and 7B are flow charts illustrating operations of the robotic device of FIG. 6 for recognizing a location change thereof according to an embodiment of the present disclosure.

Although it is described in the embodiments with reference to FIGS. 1-3, 4A, 4B, 6A and 6B that the robotic device 20 and the host 30 are separated and connected through the network 500, exemplary embodiments of the present disclosure are not limited thereto. For example, in an embodiment, the host 30 may be positioned adjacent to the robotic device 20 or directly affixed to the robotic device 20 without being connected with the robotic device through the network 500. In an embodiment, the above-described features and elements of the robotic device 20 and the host 30 shown in FIGS. 2, 3, 4A, 4B, 6A and 6B may be combined to be implemented as a single robotic device 20a as shown in FIG. 6, sharing some elements such as a processor 710, a memory 720 (e.g., a RAM or a ROM), a storage 730 (e.g., a hard disk drive), a network adaptor 740, a data collecting unit 750, and an I/O interface 760. The data collecting unit 750 may have substantially the same configuration as that of the data collecting unit 220 of FIGS. 2 and 3.

Referring to FIG. 7A, the robotic device 20a may receive a command to enter a standby mode in an operation S710. The data collecting unit 750 may collect the first environmental data ED1 corresponding to the first current location L1 in an operation S720. The processor 710 may generate the first location signature LS1 based on the first environmental data ED1 in an operation S730 and store the generated first location signature LS1 into the memory 720 or the storage 730 in an operation S740. The first location signature LS1 generated by the processor 710 may be substantially the same as the first location signature LS1 generated by the processor 210. In addition, the robotic device 20a may enter the standby mode at the first current location L1 in an operation S750 and after a certain time elapses since the operation S750, wake up from the standby mode at the second current location L2 in an operation S760. Then, the data collecting unit 750 may collect the second environmental data ED2 corresponding to the second current location L2 in an operation S770. In addition, the processor 710 may generate the second location signature LS2 based on the second environmental data ED2 in an operation S780. The second location signature LS2 generated by the processor 710 may be substantially the same as the second location signature LS2 generated by the processor 210. In an operation S790, the processor 710 may compare the second location signature LS2 with the first location signature LS1.

Thus, when the first location signature LS1 and the second location signature LS2 are matched with each other (e.g., Yes), the robotic device 20a may determine that its location has not been changed and return to the daily routine mode (e.g., a normal mode) in an operation S800. On the other hand, when the first and second location signatures LS1 and LS2 are not matched with each other, the robotic device 20 may determine that its location has been changed and go to the next step in an operation S810.

FIG. 7B illustrates operations of the robotic device 20a subsequent to the operation S810 of FIG. 7A according to an embodiment of the present disclosure. In an embodiment, referring to FIGS. 6, 7A and 7B, when it is determined that the first and second location signatures LS1 and LS2 are not matched with each other in the operation of S790, the robotic device 20a may compare the second location signature LS2 with the previously collected location signatures in an operation S820. Thus, when the robotic device 20a determines that the second location signature LS2 is matched with one (e.g., a third location signature) of the previously collected location signatures, the robotic device 20a may determine that it has been moved to a location (or a data center) corresponding to the third location signature, update the location (or a data center) L2 of the robotic device 20a to the location (or a data center) corresponding to the third location signature, and return to the daily routine mode in an operation S830. When the robotic device 20a determines that no previously collected location signature is matched with the second location signature LS2, the robotic device 20a may request a system operator to input a new location where the robotic device 20a is located (e.g., where the robotic device 20a has woken up) in an operation S840. In an embodiment, the system operator may include, but not limited to, a human that operates the robotic device 20a and a control system (e.g., a computing system 2000 of FIG. 8). In addition, the robotic device 20a may receive the input from the system operator, through the I/O interface 760, with respect to the new location (or a new data center) in an operation S850, and store the new location in the memory 720 or the storage 730 in an operation S860.

Referring to FIGS. 4A, 4B and 7A, in an embodiment, when the first and second location signatures corresponds to the first and second raw data RD1 and RD2, respectively, the comparison in the operations S500 of FIG. 4A, S540 of FIG. 4B and S790 of FIG. 7A may be performed for the first and second raw data RD1 and RD2. In this case, additional algorithms can be provided for a smart location matching. For example, if some network access points (e.g., Wi-Fi access points) are not available at the time the robotic device 20 wakes up and the first and second raw data RD1 and RD2 are matched within a predetermined threshold TH (e.g., 80%), a system may accept this as a match between the first location signature LS1 and the second location signature LS2 to determine that the first and second current locations L1 and L2 are the same as each other (e.g., a location of the robotic device 20 has not been changed). This may allow the system to be robust and not be overly reactive to simple environment changes. In an embodiment, the host 30 or other control systems (e.g., 2000 of FIG. 8) may provide the predetermined threshold TH with the robotic device 20 by a result of analysis on the first raw data RD1 and/or the second raw data RD2, or the predetermined threshold TH may be input through the I/O interface 340 from a user.

In an embodiment, when the first and second location signatures LS1 and LS2 corresponds to the first and second hash signatures HS1 and HS2, respectively, the comparison in the operations S500 of FIG. 4A, S540 of FIG. 4B and S790 of FIG. 7A may be performed for the first and second hash signatures HS1 and HS2.

In an embodiment, when the first location signature LS1 corresponds to the combination of the third raw data RD3 and the third hash signature HS3 and the second location signature LS2 corresponds to the combination of the fourth raw data RD4 and the fourth hash signature HS4, in the operations S500 of FIG. 4A, S540 of FIG. 4B and S790 of FIG. 7A, the fourth raw data RD4 may be compared with the third raw data RD3 and the fourth hash signature HS4 may be compared with the third hash signature HS3. When the third and fourth raw data RD3 and RD4 are matched within a predetermined threshold TH, the robotic device 20 may determine that they are matched. When the third and fourth raw data RD3 and RD4 are not matched within the predetermined threshold TH, the robotic device 20 may determine that they are not matched. In an embodiment, the host 30 or other control systems (e.g., 2000 of FIG. 8) may provide the predetermined threshold TH with the robotic device 20 by a result of analysis on the third raw data RD3 and/or the fourth raw data RD4. In an embodiment, the predetermined threshold TH may be input through the I/O interface 340 from a user.

The comparison operations (e.g., S570 of FIG. 5A, S650 of FIG. 5B and S820 of FIG. 7B) between the second location signature LS2 and the previously collected location signatures may be performed in substantially the same as or similar manner to those given for the first and second location signatures LS1 and LS2 described above. Thus, duplicate description will be omitted.

In an embodiment, referring back to FIG. 6, the memory 720 of the robotic device 20a may include a service application program 721 for managing and running the above-described operations of the robotic device 20a of FIGS. 7A and 7B.

Figure 8:
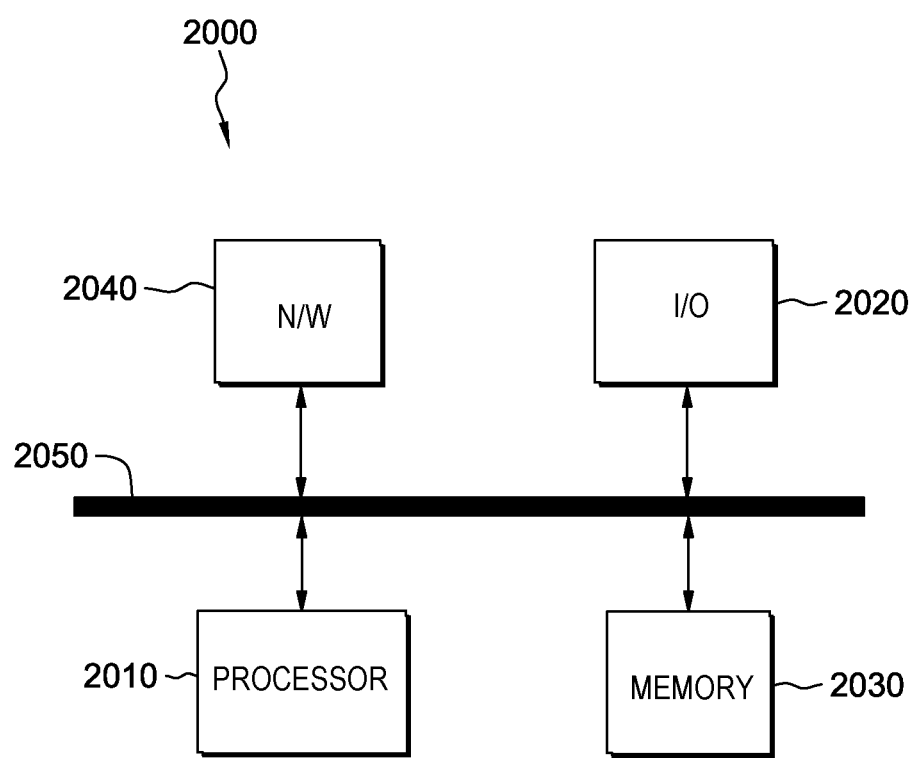
FIG. 8 illustrates an example of a computing system according to an embodiment of the present disclosure.

FIG. 8 illustrates an example of a computing system 2000 according to an embodiment of the present disclosure.

In an embodiment, a control system for the robotic device 20, the host 30, and/or the robotic device 20a may be implemented with the computing system 2000. The computing system 2000 may include, but not limited to, a processor 2010, an I/O device 2020, a memory system 2030, a network adaptor 2040, and a bus 2050 that couples various system components including the processor 2010, the I/O device 2020, the memory system 2030, and the network adaptor 2040. The computing system 2000 may include a program module for performing the above-described methods of recognizing a location of a robot device (e.g., 20 of FIG. 2 or 20a of FIG. 6), according to exemplary embodiments. For example, the program module may include routines, programs, objects, components, logic, data structures, or the like, for performing particular tasks or implement particular abstract data types. The processor 2010 may execute instructions written in the program module to operate the above-described compensation methods for the misalignments along the seam. The program module may be programmed into the integrated circuits of the processor (e.g., 2010). In an exemplary embodiment of the present disclosure, the program module may be stored in the memory system 2030 or in a remote computer system storage media through the network adaptor 2040.

The computing system 2000 may include a variety of computing system readable media. Such media may be any available media that is accessible by the computing system 2000, and it may include both volatile and non-volatile media, removable and non-removable media.

The memory system 2030 can include computer system readable media in the form of volatile memory, such as random access memory (RAM) and/or cache memory or others. The computer system 2000 may further include other removable/non-removable, volatile/non-volatile computer system storage media.

The present disclosure may be a circuit, a system, a method, and/or a computer program product. The computer program product may include a non-transitory computer readable storage medium (e.g., the memory system 2030) having computer readable program instructions thereon for causing a processor to carry out aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computer system (e.g., 2000) through any type of network, including a LAN or a WAN, or the connection may be made to an external computer (for example, through the Internet using an Internet Service Provider). In an exemplary embodiment of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, circuits, systems, and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A computer-implemented method for recognizing a location of a robotic device in one or more data centers, the method comprising performing, by one or more processors, steps of:
    controlling a data collecting unit to collect first environmental data corresponding to a first current location of the robotic device in the one or more data centers;
    generating a first location signature based on the first environmental data;
    driving the robotic device to enter a standby mode at a first time;
    driving the robotic device to wake up from the standby mode at a second time after a predetermined time elapses after the driving the robotic device to enter the standby mode;
    controlling the data collecting unit to collect second environmental data corresponding to a second current location of the robotic device;
    generating a second location signature generated based on the second environmental data;
    comparing the second location signature with the first location signature; and
    determining whether the location of the robotic device has been changed between the first and second times based on a comparison result of the second location signature with the first location signature.

2. The method of claim 1, wherein the determining whether a location of the robotic device has been changed comprises:
    determining that the location of the robotic device has not been changed when the first and second location signatures are matched; and
    determining that the location of the robotic device has been changed when the first and second location signature are not matched.

3. The method of claim 1, wherein the first location signature includes at least one of first raw data or a first hash signature,
    wherein the first raw data is generated by reorganizing the first environmental data according to a predetermined rule, and the first hash signature is generated by using a hashing algorithm to the first raw data,
    wherein the second location signature includes at least one of second raw data or a second hash signature, and
    wherein the second raw data is generated by reorganizing the second environmental data according to the predetermined rule, and the second hash signature is generated by applying the hashing algorithm to the second raw data.

4. The method of claim 3, wherein the comparing of the second location signature with the first location signature comprises at least one of comparing of the second raw data with the first raw data and comparing of the second hash signature with the first hash signature,
    wherein the comparing of the second raw data with the first raw data includes determining whether the first and second raw data are matched within a predetermined threshold and
    determining that the location of the robotic device has been changed when the first and second raw data are not matched within the predetermined threshold.

5. The method of claim 2, further comprising:
    comparing the second location signature with other one or more location signatures stored in a database when it is determined that the location of the robotic device has been changed; and
    updating the location of the robotic device to a location corresponding to a third location signature when the second location signature is matched with the third location signature of the other one or more location signatures.

6. The method of claim 1, wherein each of the first and second environmental data includes at least one of an ID of a network in the vicinity of the robotic device, a connection strength to a network device in the vicinity of the robotic device, radio-frequency identifier (RFID) information obtained by reading from a tag in the vicinity of the robotic device, a camera picture in the vicinity of the robotic device, or a global position system in the vicinity of the robotic device.

7. The method of claim 1, wherein each of the first and second environmental data is static for a predetermined period.

8. The method of claim 2, further comprising:
    generating a false positive signal when it is determined that the location of the robotic device has been changed, upon receiving a conformation signal indicating that the location of the robotic device has not been changed.

9. The method of claim 8, further updating the first location signature corresponding the first current location to the second location signature.

10. The method of claim 3, wherein each of the first and second hash signatures is generated using at least one of hashing algorithms of MD5 message-digest algorithm or secure hash algorithm (SHA).

11. The method of claim 1, wherein the determining whether the location of the robotic device has been changed includes determining whether a data center in which the robotic device is located has been changed to another data center.

12. A system for recognizing a location of a robotic device in one or more data centers, comprising:
    a signal collecting unit configured to collect first environmental data corresponding to a first current location of the robotic device prior to the robotic device entering a standby mode and to collect second environmental data corresponding to a second current location of the robotic device after the robotic device waking up from the standby mode; and a processing unit generating a first location signature based on the first environmental data and a second location signature using the second environmental data, comparing the second location signature with the first location signature, and determining whether the location of the robotic device has been changed during the standby mode of the robotic device based on a comparison result of the second location signature with the first location signature.

13. The system of claim 12, wherein the processing unit determines that the location of the robotic device has not been changed when the first and second location signatures are matched, and the processing unit determines that the location of the robotic device has been changed when the first and second location signatures are not matched.

14. The system of claim 12, wherein the first location signature includes at least one of first raw data or a first hash signature, wherein the processing unit generates the first raw data by reorganizing the first environmental data according to a predetermined rule, and generates the first hash signature by applying a hashing algorithm to the first raw data, wherein the second location signature includes at least one of second raw data or a second hash signature, and wherein the processing unit generates the second raw data by reorganizing the second environmental data according to the predetermined rule, and generates the second hash signature by applying the hashing algorithm to the second raw data.

15. The system of claim 13, wherein the processing unit generates a false positive signal when it is determined that the location of the robotic device has been changed, upon receiving a conformation signal indicating that the location of the robotic device has not been changed.

16. The system of claim 15, wherein the processing unit generates each of the first and second hash signatures using at least one of hashing algorithms of MD5 message-digest algorithm or secure hash algorithm (SHA).

17. A computer program product stored in a non-transitory computer-readable storage medium having computer readable program instructions, the computer readable program instructions read and carried out by a processor for performing a method of recognizing a location of a robotic device in one or more data centers, wherein the method comprises:

collecting first environmental data corresponding to a first current location of the robotic device in the one or more data centers;

generating a first location signature based on the first environmental data;

driving the robotic device to enter a standby mode at a first time;

driving the robotic device to wake up from the standby mode at a second time after a predetermined time elapses after the driving the robotic device to enter the standby mode;

collecting second environmental data corresponding to a second current location of the robotic device;

generating a second location signature generated based on the second environmental data;

comparing the second location signature with the first location signature; and determining whether the location of the robotic device has been changed between the first and second times based on a comparison result of the second location signature with the first location signature.

18. The computer program product of claim 17, wherein the determining whether a location of the robotic device has been changed comprises:

determining that the location of the robotic device has not been changed when the first and second location signatures are matched; and determining that the location of the robotic device has been changed when the first and second location signature are not matched.

19. The computer program product of claim 17, wherein the first location signature includes at least one of first raw data or a first hash signature, wherein the first raw data is generated by reorganizing the first environmental data in a predetermined rule, and the first hash signature is generated by applying a hashing algorithm to the first raw data, wherein the second data includes at least one of second raw data or a second hash signature, and wherein the second raw data is generated by reorganizing the second environmental data in the predetermined rule, and the second hash signature is generated by applying the hashing algorithm to the second raw data.

20. The computer program product of claim 18, wherein the method further comprises:

comparing the second location signature with other one or more location signatures stored in a database when it is determined that the location of the robotic device has been changed; and updating the location of the robotic device to a location corresponding to a third location signature when the second location signature is matched with the third location signature of the other one or more location signatures.

* * * * *